United States Patent
Okushita et al.

(10) Patent No.: US 6,297,345 B1
(45) Date of Patent: Oct. 2, 2001

(54) POLYAMIDE HAVING EXCELLENT STRETCHING PROPERTIES

(75) Inventors: Hiroshi Okushita; Shoichi Tanaka, both of Yamaguchi (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 09/564,099

(22) Filed: May 3, 2000

(30) Foreign Application Priority Data

May 27, 1999 (JP) .................................................. 11-147572
Jun. 22, 1999 (JP) .................................................. 11-174944
Jul. 26, 1999 (JP) .................................................. 11-210174

(51) Int. Cl.$^7$ ............................. C08G 73/10; C08G 69/02
(52) U.S. Cl. ......................... 528/170; 528/310; 528/314; 528/321; 528/323; 528/324; 528/332; 528/335; 528/339; 528/342; 528/502 B; 428/365; 428/395; 428/474.4
(58) Field of Search .................................. 528/310, 170, 528/324, 314, 321, 335, 342, 339, 323, 502 B; 428/395, 365, 474.4

(56) References Cited

U.S. PATENT DOCUMENTS

| | | | |
|---|---|---|---|
| 3,012,994 | 12/1961 | Bell et al. | 528/349 |
| 3,937,687 | 2/1976 | Rogier et al. | 528/349 |
| 4,218,351 | * 8/1980 | Rasmussen | 528/329.1 |
| 4,223,127 | 9/1980 | Meyer et al. | 528/324 |
| 4,255,559 | 3/1981 | Pfeifer | 528/338 |
| 4,255,560 | 3/1981 | Meyer et al. | 528/339 |
| 4,258,176 | 3/1981 | Pfiefer et al. | 528/338 |
| 4,258,177 | 3/1981 | Pfeifer | 528/338 |
| 4,264,762 | 4/1981 | Cordes et al. | 528/349 |
| 4,293,688 | 10/1981 | Campbell et al. | 528/316 |
| 4,731,421 | 3/1988 | Hoppe et al. | 525/432 |
| 4,794,158 | 12/1988 | Hasuo et al. | 528/338 |
| 4,963,646 | 10/1990 | Galland et al. | 528/347 |
| 5,053,281 | * 10/1991 | Sakashita et al. | 428/412 |
| 5,849,826 | * 12/1998 | Ogo et al. | 528/324 |

FOREIGN PATENT DOCUMENTS

| | | |
|---|---|---|
| 0 135 815 A2 | 8/1984 | (EP) . |
| 1132039 | 3/1966 | (GB) . |
| 1193487 | 10/1967 | (GB) . |

* cited by examiner

*Primary Examiner*—P. Hampton-Hightower
(74) *Attorney, Agent, or Firm*—Akin, Gump, Strauss, Hauer & Feld, L.L.P.

(57) ABSTRACT

A polyamide with excellent stretching properties is disclosed, which comprises 50 to 99.8 mol % of a unit derived from a lactam and/or an aminocarboxylic acid, 0.1 to 25 mol % of a unit derived from a dicarboxylic acid, and 0.1 to 25 mol % of a unit derived from a diamine component containing 10 to 100 mol % of at least one compound selected from the group consisting of a branched saturated diamine having 6 to 22 carbon atoms, a branched alicyclic diamine having 6 to 16 carbon atoms, and a norbornanediamine.

11 Claims, No Drawings

POLYAMIDE HAVING EXCELLENT STRETCHING PROPERTIES

FIELD OF THE INVENTION

This invention relates to a novel polyamide having excellent stretching properties. More particularly, it relates to a polyamide containing a diamine unit derived from a branched saturated diamine having 6 to 22 carbon atoms, a branched alicyclic diamine having 6 to 16 carbon atoms or a norbornanediamine which is suitable as a material of a stretched film, particularly a successive biaxial stretching film.

BACKGROUND OF THE INVENTION

Polyamides, being excellent in heat resistance and gas barrier properties are used as packaging material for food, such as retort-packaged pouch food. The characteristics required of polyamide have recently been diversified with the steadily broadening application to food packaging. For example, there has been a demand for a polyamide providing a thin film having mechanical strength sufficient for practical use and excellent gas barrier properties, particularly a polyamide fit for productive successive biaxial stretching.

In general, on being stretched, a film prepared from a crystalline polymer reduces it thickness and increases mechanical strength per unit as is well known in the art. The stretching technique has been used to manufacture thin and mechanically strong films from various crystalline polymers.

However, it is recognized in the art that a film, a monofilament, a fiber, etc. of a crystalline polyamide, such as nylon 6 or nylon 66, tends to suffer from uneven stretching or tends to be broken at a relatively low draw ratio on being stretched unless the stretching conditions are controlled within narrow ranges. Where, in particular, a nylon film is subjected to successive biaxial stretching, which is deemed advantageous for mass production, by first-stage stretching (which may hereinafter be called "primary stretching") in the extruding direction of the film followed by second-stage stretching (which may hereinafter be called "secondary stretching") in the direction perpendicular to the extruding direction, it is known that the secondary stretching meets difficulty. This is considered to be because the polyamide molecules are oriented in parallel to the film surface by the primary stretching to form hydrogen bonds among molecules, whereby crystallization seems to proceed to make the film hard, which will make secondary stretching difficult. Therefore, it has been demanded to develop a polyanude which has excellent stretching properties fit for successive biaxial stretching.

A large number of proposals have been made to date as for improvement on stretching properties of polyamide. For example, JP-A-52-104565 (the term "JP-A" as used herein means an "unexamined published Japanese patent application") discloses a process for producing a successive biaxial stretching film, which comprises primary stretching a polyamide film to a planar orientation index of 0.6 to 1.5 and secondly stretching the film, wherein the film to be stretched is prepared by melt molding a polyblend of an aliphatic polyamide and a polyamide comprising xylylenediamine and an aliphatic α, ω-dicarboxylic acid. JP-B-55-41901 (the term "JP-B" as used herein means an "examined Japanese patent publication") teaches a process for producing a successive biaxial stretching film which comprises primary stretching a film to a planar orientation index of 0.6 to 1.5 and secondly stretching the film, wherein the film to be stretched is prepared from a composition comprising an aliphatic polyamide, other polyamide that is compatible with the aliphatic polyamide, and a nucleating agent of such an amount that the isothermal crystallization parameter may become 1.1 to 2.5. JP-B-62-25704 proposes a process for producing a stretched film from a polyblend comprising an aliphatic polyamide and a polyamide comprising 2,2,4-trimethyl-1,6-diaminohexane and/or 2,4,4-trimethyl-1,6-diaminohexane and an aromatic and/or alicyclic dicarboxylic acid in a specific blending ratio. JP-B-6-43552 discloses a polyamide composition suited to biaxial stretching which is obtained from a polyblend of a copolyamide comprising an aliphatic polyamide and a semi-aromatic polyamide and a semi-aromatic polyamide comprising an aliphatic diamine and isophthalic acid and/or terephthalic acid.

Copolyamides having improved stretching properties that have been proposed include a copolyamide comprising ε-caprolactam, hexamethyleneisophthalamide and hexamethyleneterephthalamide (JP-A-53-5250) and a polyamide comprising at least a dicarboxylic acid and an alicyclic diamino compound (JP-A-60-104312).

JP-A-53-88053 offers a process for producing a successive biaxial stretching film from a polyblend comprising an aliphatic polyamide and a polyamide containing 50 mol % or more of a polyamide unit composed of 2,2,4- and/or 2,4,4-trimethylhexamethylenediamine and an aromatic and/or alicyclic dicarboxylic acid. JP-A-62-127346 discloses a polyamide composition comprising a copolyamide obtained from an aliphatic polyamide and a semi-aromatic polyamide and a semi-aromatic polyamide obtained from an aliphatic diamine and isophthalic acid and/or terephthalic acid.

The proposed copolyamides or polyamide compositions exhibit improved stretching properties as compared with a single polyamide, such as nylon 6, but the reached degree of improvement cannot be said to be sufficient. That is, the maximum draw ratio at which a film, etc. can be stretched uniformly is sometimes low. For example, uneven stretching tends to occur where the draw ratio exceeds 3. Further, when secondary stretching is carried out by successive biaxial stretching, they often suffer from uneven stretching or breaks at a low draw ratio.

SUMMARY OF THE INVENTION

An object of the present invention is to provide a polyamide having excellent stretching properties particularly in successive biaxial stretching.

The present inventors have investigated the relationship between the polyamide molecular structure and stretching properties, aiming at obtaining a polyamide with excellent stretching properties particularly in successive biaxial stretching. As a result, they have found that a polyamide having in the molecular chain thereof a unit derived from at least one of a branched saturated diamine having 6 to 22 carbon atoms, a branched alicyclic diamine having 6 to 16 carbon atoms, and a norbornanediamine exhibits excellent stretching properties.

The present invention provides the following embodiments in the practice.

(1) A polyamide with excellent stretching properties which comprises a unit derived from a lactam and/or an aminocarboxylic acid, a unit derived from a dicarboxylic acid, and a unit derived from a diamine component containing at least one compound selected from the group consisting of a branched saturated diamine having 6 to 22 carbon atoms, a branched alicyclic diamine having 6 to 16 carbon atoms, and a norbornanediamine.

(2) The polyamide with excellent stretching properties as set forth in (1), wherein the diamine component comprises at least one compound selected from the group consisting of a branched saturated diamine having 6 to 22 carbon atoms, a branched alicyclic diamine having 6 to 16 carbon atoms, and a norbornanediamine in a proportion of 10 to 100 mol % based on the total diamine component.

(3) The polyamide with excellent stretching properties as set forth in (1), which comprises 50 to 99.8 mol % of the unit derived from a lactam and/or an aminocarboxylic acid, 0.1 to 25 mol % of the unit derived from a dicarboxylic acid, and 0.1 to 25 mol % of the unit derived from a diamine component, wherein 10 to 100 mol % of the diamine is at least one compound selected from the group consisting of a branched saturated diamine having 6 to 22 carbon atoms, a branched alicyclic diamine having 6 to 16 carbon atoms, and a norbornanediamine.

(4) The polyamide with excellent stretching properties as set forth in any one of (1) to (3), wherein the branched saturated diamine is 2,2,4-trimethyl-1,6-diaminohexane, 2,4,4-trimethyl-1,6-diaminohexane, 1,2-diaminopropane, 1,3-diaminopentane, 2-methyl-1,5-diaminopentane, 2-methyl-1,8-diaminooctane, or a mixture thereof.

(5) The polyamide with excellent stretching properties as set forth in any one of (1) to (3), wherein the branched alicyclic diamine is 5-amino-2,2,4-trimethyl-1-cyclopentanemethylamine, 5-amino-1,3,3-trimethylcyclohexanemethylamine, or a mixture thereof.

(6) A film, a monofilament or a fiber prepared from the polyamide set forth in any one of (1) to (5).

(7) A successive biaxial stretching film prepared from the polyamide set forth in any one of (1) to (5).

It is not clear why a polyamide having a branched saturated diamine having 6 to 22 carbon atoms as a constituent unit exhibits excellent stretching properties particularly in successive biaxial stretching that has been difficult to carry out with a conventional polyamide film. It is assumed that the branches of the diamine unit introduced into the polyamide molecular chains serve to weaken the mutual action of the hydrogen bonds formed among the molecules on being stretched, whereby the planar orientation of the polyamide molecules is suppressed and, consequently, crystallization is suppressed. This assumption could be supported by the fact that the stretched film of the polyamide of the invention which contains the branched saturated diamine having 6 to 22 carbon atoms as a constituent unit has a smaller degree of whole molecule planar orientation than that of nylon 6 having substantially the same draw ratio.

It is not clear why a polyamide having a branched alicyclic diamine having 6 to 16 carbon atoms and/or a norbornanediamine as a constituent unit exhibits excellent stretching properties particularly in successive biaxial stretching that has been difficult to carry out with a conventional polyamide film. Seeing that the branched alicyclic diamine has a bulkier molecule structure than aliphatic polyamides such as nylon 6, it is assumed that the bulky structure introduced into the polyamide molecular chains weakens the mutual action of the hydrogen bonds formed among the molecules on being stretched, whereby the planar orientation of the polyamide molecules is suppressed and, consequently, crystallization is suppressed. This assumption could be supported by the fact that the stretched film of the polyamide of the invention which contains the branched alicyclic diamine unit or the norbornanediamine unit has a smaller degree of whole molecule planar orientation than that of nylon 6 having substantially the same draw ratio.

The term "excellent stretching properties" as used herein is intended to mean capability of being stretched 3 or more times in secondary stretching in the direction perpendicular to the direction of primary stretching, the film having been stretched 3 times in the primary stretching, and the primary and the secondary stretching operation being carried out at a temperature ranging from the glass transition temperature (hereinafter, "Tg") of the polyamide up to (Tg+50)° C. at a stretch rate of 35 mm/sec. The equipment for making the evaluation of stretching properties is not particularly limited as long as the above-described measurement can be made, and known testing equipment or production equipment for biaxial stretching, such as a biaxial stretching machine "BIX-703" manufactured by Iwamoto Seisakusho, can be used

DETAILED DESCRIPTION OF THE INVENTION

The polyamide of the present invention comprises a unit derived from a lactam and/or an aminocarboxylic acid, a unit derived from a dicarboxylic acid, and a unit derived from a diamine component containing a branched saturated diamine having 6 to 22 carbon atoms (hereinafter simply referred to as a branched saturated diamine) and/or a branched alicyclic diamine having 6 to 16 carbon atoms (hereinafter simply referred to as a branched alicyclic diamine) and/or a norbornanediamine. These diamine compounds will hereinafter be sometimes referred to as "specific diamine compounds" or, inclusively, "specific diamine component".

The lactam which can be used in the invention includes $\epsilon$-caprolactam, $\omega$-enantholactam, $\omega$-undecalactam, $\omega$-dodecalactam, and 2-pyrrolidone. The aminocarboxylic acid useful in the invention includes 6-aminocaproic acid, 7-aminoheptanoic acid, 8-aminooctanoic acid, 10-aminocapric acid, 11-aminoundecanoic acid, and 12-aminododecanoic acid. The lactams or the aminocarboxylic acids can be used either individually or as a combination of two or more thereof, respectively. The lactam(s) and the aminocarboxylic acid(s) can be used in combination at an arbitrary mixing ratio. A copolyamide comprising a polyamide derived from the lactam and/or the aminocarboxylic acid and a polyamide derived from a branched saturated diamine, a branched alicyclic diamine and/or a norbornanediamine exhibits improved stretching properties even with the content of the latter polyamide being small.

The dicarboxylic acids which can be used in the invention include aliphatic dicarboxylic acids, such as adipic acid, suberic acid, azelaic acid, sebacic acid, and dodecanoic acid; alicyclic dicarboxylic acids, such as 1,4-dicarboxycyclohexane; and aromatic dicarboxylic acids, such as isophthalic acid, terephthalic acid and naphthalene-dicarboxylic acid. These dicarboxylic acids can be used either individually or as an appropriate mixture of two or more thereof.

The branched saturated diamine which can be used in the present invention includes 2,2,4-trimethyl-1,6-diaminohexane, 2,4,4-trimethyl-1,6-diaminohexane, 1,2-diaminopropane, 1,3-diaminopentane, 2-methyl-1,5-diaminopentane, and 2-methyl- 1,8-diaminooctane. They can be used either individually or as an appropriate mixture of two or more thereof.

The norbornanediamine which can be used in the present invention includes 2,5-norbornanedimethylamine, 2,6-norbornanedimethylamine, and a mixture thereof having an arbitrary mixing ratio.

The branched alicyclic diamine which can be used in the invention includes 5-amino-2,2,4-trimethyl-1-cyclopentanemethylamine, 5-amino-1,3,3-trimethylcyclohexanemethylamine (also called isophoronediamine). These diamines may have either a cis-configuration or a trans-configuration, or a cis-/trans-mixed configuration.

Other diamines which can be used in combination with the above-described specific diamine compounds include aliphatic diamines, such as ethylenediamine, tetramethylenediamine, hexamethylenediamine, nonamethylenediamine, undecamethylenediamine, and dodecamethylenediamine; alicyclic diamines, such as bis(4-aminocyclohexyl)methane, bis(4-aminocyclohexyl)propane, 1,3-bisaminomethylcyclohexane, and 1,4-bisaminomethylcyclohexane; and aromatic diamines, such as m-xylylenediamine and p-xylylenediamine. These diamines can be used either individually or as an appropriate mixture of two or more thereof.

The dicarboxylic acid(s) and the diamine component containing the specific diamine compound(s) are used at an approximately equimolar ratio.

The proportions of the unit derived from the lactam and/or the aminocarboxylic acid, the unit derived from the dicarboxylic acid, and the unit derived from the diamine component in the polyamide are preferably 50 to 99.8 mol %, particularly 70 to 99.5 mol %; 0.1 to 25 mol %, particularly 0.25 to 15 mol %; and 0.1 to 25 mol %, particularly 0.25 to 15 mol %; respectively. It is preferred for the diamine component to contain the specific diamine compounds of the invention (i.e., the branched saturated diamine, the branched alicyclic diamine and/or the norbornanediamine) in a total proportion of 10 to 100 mol %, particularly 30 to 100 mol %, especially 50 to 100 mol %. If the proportion of the unit derived from the lactam and/or the aminocarboxylic acid is less than 50 mol %, the resulting polyamide may have reduced mechanical strength. If it exceeds 99.8 mol %, the polyamide tends to have reduced stretching properties. Where the proportion of the specific diamine component in the total diamine component is less than 10 mol %, the improving effects on stretching properties are lessened. If the proportion of the specific diamine component in the polyamide exceeds 25 mol %, the stretching properties are further improved, but practical properties such as mechanical strength will be reduced.

Production of the polyamide can be carried out in either a batch process or a continuous process by use of known apparatus for polyamide production, such as a batch reactor, a single tank or multiple tank continuous reactor, a tubular continuous reactor, a single-screw or twin-screw reactive extruder, and the like. Polymerization is effected by known processes, such as melt polymerization, solution polymerization, and solid phase polymerization. These polymerization processes may be used singly or in an appropriate combination.

For example, a lactam and/or an aminocarboxylic acid, a dicarboxylic acid, a diamine component comprising the specific diamine compound, and water are charged in a pressure vessel and allowed to polycondensate at a temperature ranging from 200 to 350° C. under pressure in a closed system. The pressure is diminished, and the polycondensation reaction is allowed to continue at 200 to 350° C. under atmospheric pressure or reduced pressure to make the molecular weight increase. The diamine component and the dicarboxylic acid may be put into the pressure vessel as such, or an almost equimolar mixture of the diamine and the dicarboxylic acid is dissolved in an alcohol to form a nylon salt, which is put into the pressure vessel either as dissolved or in the form of a concentrated solution or in the form of a solid obtained by recrystallization. Water to be used in the reaction is preferably oxygen-free ion-exchanged water or distilled water. Water is usually used in an amount of 1 to 150 parts by weight per 100 parts by weight of the material constituting the polyamide.

The resulting polyamide is usually withdrawn from the reaction vessel in a molten state, cooled with water, etc., and pelletized. Where the polyamide contains a large amount of unreacted monomers (e.g., in the form of nylon 6), the pellets are treated with, for example, hot water to remove the unreacted monomers before processing into film, monofilament, fiber, etc. The polyamide of the invention preferably has a relative viscosity ($\eta r$) of 1.5 to 5.0, particularly 2.0 to 4.5, especially 2.0 to 4.0, as measured in accordance with JIS K6810. The kind of the end groups, the concentrations of the end groups, and the molecular weight distribution of the polyamide are not particularly limited.

If desired, a phosphorus compound can be added to the reaction system for polymerization acceleration or oxidation prevention, such as phosphoric acid, phosphorus acid, hypophosphorous acid, polyphosphoric acid, or an alkali metal salt thereof. The phosphorus compound is usually added in an amount of 50 to 3,000 ppm based on the polyamide produced. For molecular weight control or stabilization of melt viscosity during processing, an amine, such as laurylamine, stearylamine, hexamethylenediamine or m-xylylenediamine, or a carboxylic acid, such as acetic acid, benzoic acid, stearic acid, hexanedioic acid, isophthalic acid or terephthalic acid, can be added to the reaction system. The amount of the molecular weight modifier to be added, being dependent on the reactivity of the modifier or the polymerization conditions, is decided so that the resulting polyamide may have a relative viscosity falling within the above range (i.e., 1.5 to 5.0).

The polyamide of the present invention can be molded into film in accordance with well-known film formation techniques, such as a flat process, inflation process, tubular process, solvent casting, hot pressing, and so forth. The polyamide can also be processed into monofilaments or fibers in accordance with well-known techniques. In melt extrusion such as flat process, inflation process or melt spinning, the polyamide is melted at a temperature ranging from the melting point of the polyamide up to 320° C.

A successive biaxial stretching film can be produced from the polyamide as follows. The polyamide, which can contain necessary additives, such as lubricants (e.g., calcium stearate, bisamide compounds, silica, and talc), slip agents, nucleating agents, and the like, is melt-extruded from a T-die extruder to obtain an unstretched film. The unstretched film is stretched on the same line or after once being wound up. Stretching is carried out at or above the Tg of the polyamide. The polyamide film is stretched two to five times (draw ratio=1 to 5), preferably 2.5 to 4 times, in one direction at a temperature ranging from Tg to (Tg+50)° C. and then stretched two to five times, preferably 2.5 to 4 times, in the direction perpendicular to the primary stretching direction at a temperature that is the same as or slightly higher than the primary stretching temperature. The biaxially stretched film is heat-set at 150° C. or higher.

The polyamide of the present invention can contain various additives as long as the effects of the invention are not impaired. Useful additives include heat stabilizers, UV absorbers, light stabilizers, antioxidants, antistatic agents, tackifiers, sealability improving agents, anti-fogging agents, release agents, impact modifiers, plasticizers, pigments, dyes, perfumes, reinforcing materials, and the like.

The polyamide of the present invention is particularly favorable as a material of stretched films, especially a material of films to be subjected to successive biaxial stretching. The polyamide of the invention is also useful as a material to be processed into monofilaments or fibers, and the resulting monofilaments or fibers similarly exhibit satisfactory stretching properties Additionally, the polyamide of the invention is also useful as a molding material for obtaining various molded articles by injection molding, compression molding, vacuum forming or the like techniques.

The present invention will now be illustrated in greater detail with reference to Examples in view of Comparative Examples. In Examples and Comparative Examples the relative viscosity of polyamides prepared, the degree of whole molecule planar orientation, and the draw ratio at break in secondary stretching were measured as follows.

1) Relative viscosity ($\eta r$) of polyamide

A relative viscosity of a 1 wt/vol % solution of a polyamide in 98 wt % concentrated sulfuric acid was measured with an Ubbellohde viscometer at 25° C. in accordance with JIS K6810.

2) Degree of whole molecule planar orientation in film stretched in extruding direction An unstretched film 92 mm wide by 92 mm long was set on a biaxial stretching machine, BIX-703 supplied by Iwamoto Seisakusho, that had been conditioned at a prescribed temperature (50° C. , 60° C. or 70° C.), preheated at that temperature for 20 seconds, and stretched three times in the extruding direction at a stretch rate of 35 mm/sec or 140 mm/sec. After heat-setting at 200° C., the resulting uniaxially stretched film was used as a specimen for measurement. The refractive indices of the stretched film in the direction of stretching (Nx), in the width direction (Ny) and in the thickness direction (Nz) were measured with an automatic birefringencemeter, KOBRA-21ADH manufactured by Oji Keisoku Kiki). The degree of whole molecule planar orientation (P) was obtained from these refractive indices according to equation:

$$P = [(Nx+Ny)/2] - Nz$$

wherein P: degree of whole molecule planar orientation;
Nx: refractive index in the direction of stretching;
Ny: refractive index in the width direction; and
Nz: refractive index in the thickness direction.

The smaller the P value, the lesser the orientation of polyamide molecules, and the better the stretching properties.

3) Draw ratio at break in secondary stretching

An unstretched film was set on a biaxial stretching machine, BIX-703, having been conditioned at 60° C., preheated at that temperature for 20 seconds, and stretched three times in the machine direction at that temperature at a stretch rate of 35 mm/sec or 140 mm/sec and then stretched in the direction perpendicular to the primary stretching direction at a rate of 35 mm/sec or 140 mm/sec until the film was broken. The draw ratio at break was measured.

EXAMPLE 1

In a 5-liter pressure vessel equipped with a stirrer, a thermometer, a pressure gauge, and a pressure control and having an outlet for withdrawing a polymer produced were introduced 2200 g of ε-caprolactam, 41.2 g of a mixture of 2,2,4-trimethyl-1,6-diaminohexane and 2,4,4-trimethyl-1,6-diaminohexane (Vestamine TMD, available from Hulls, Japan), 38 g of adipic acid, and 120 g of distilled water. The inner atmosphere was displaced with nitrogen by repeating nitrogen introduction followed by nitrogen release several times, and the inner temperature was raised to 240° C. The mixture was allowed to react at 240° C. for 4-hours while stirring. After the temperature was elevated up to 270° C., the inner pressure was released to a gauge pressure of 0 kg/cm² G over a 2-hour period. Subsequently, the reaction mixture was stirred at 270° C. for 6 hours while introducing nitrogen gas at a rate of 150 ml/min. The stirring was ceased, and a molten polyamide thus produced was withdrawn in the form of a strand, washed with water, and pelletized to obtain about 1800 g of pellets. The resulting pellets were washed with running hot water at 90 to 95° C. for several hours and dried in vacuo at 80° C. for 24 hours. The resulting polyamide had a relative viscosity ($\eta r$) of 3.13.

The polyamide (1500 g) was compounded with 0.45 g of calcium stearate, and the mixture was fed to an extruder equipped with a coat hanger flat die, melt kneaded at 260° C., and extruded onto chill rolls kept at about 35° C. to obtain an unstretched film having a thickness of 120 μm. The unstretched film was stored in an aluminum bag at 0° C. or below so as not to absorb moisture until evaluation of stretching properties.

A 92 mm long and 92 mm wide sample piece cut out of the unstretched film was set on a biaxial stretching machine BIX-703 preheated in a prescribed temperature atmosphere (50° C., 60° C. or 70° C.) for 20 seconds, and stretched three times in the extruding direction in the same temperature atmosphere at a rate of 35 mm/sec (primary stretching). The degree of whole molecule planar orientation of the resulting uniaxially stretched film was measured. The results obtained are shown in Table 1.

Further, the unstretched film was uniaxially stretched in the same manner as described above in a 60° C. atmosphere and then stretched in the direction perpendicular to the primary stretching direction in a 60° C. atmosphere at the same stretch rate as in the primary stretching until the film was broken. The draw ratio at break in the secondary stretching was 4.

EXAMPLE 2

A polyamide was prepared in the same manner as in Example 1, except that 2200 g of ε-caprolactam, 13.0 g of a mixture of 2,2,4-trimethyl-1,6-diaminohexane and 2,4,4-trimethyl-1,6-diaminohexane (Vestamine TMD), 12.1 g of adipic acid, and 100 g of distilled water were charged in a pressure vessel. The relative viscosity ($\eta r$) of the polyamide was 3.47.

The polyamide was extruded into film, and the film was evaluated in the same manner as in Example 1. The degree of whole molecule planar orientation is shown in Table 1. When the film was biaxially stretched successively, the draw ratio at break in the secondary stretching was 3.5.

EXAMPLE 3

A polymide was prepared in the same manner as in Example 1, except that 2200 g of ε-caprolactam, 19.7 g of a mixture of 2,2,4-trimethyl-1,6-diaminohexane and 2,4,4-trimethyl-1,6-diaminohexane (Vestamine TMD), 3.6 g of hexamethylenediamine, 25.9 g of isophthalic acid, and 110 g of distilled water were charged in a pressure vessel. The relative viscosity ($\eta r$) of the polyamide was 3.51.

The polyamide was extruded into film, and the film was evaluated in the same manner as in Example 1. The degree of whole molecular planar orientation is shown in Table 1. In the successive biaxial stretching, the draw ratio at break in the secondary stretching was 3.0.

EXAMPLE 4

A polyamide was prepared in the same manner as in Example 1, except that 2200 g of ε-caprolactam, 30.1 g of 2-methyl-1,5-diaminopentane, 37.9 g of adipic acid, and 118 g of distilled water were charged in a pressure vessel. The relative viscosity (ηr) of the polyamide was 3.55.

The polyamide was extruded into film, and the film was evaluated in the same manner as in Example 1. The degree of whole molecule planar orientation is shown in Table 1. In the successive biaxial stretching, the draw ratio at break in the second-stretching was 3.3.

EXAMPLE 5

A polyamide was prepared in the same manner as in Example 1, except that 2200 g of ε-caprolactam, 35.4 g of 2-methyl-1,8-diaminooctane, 32.6 g of adipic acid, and 118 g of distilled water were charged in a pressure vessel. The relative viscosity (ηr) of the polyamide was 3.55.

The polyamide was extruded into film, and the film was evaluated in the same manner as in Example 1. The degree of whole molecule planar orientation is shown in Table 1. In the successive biaxial stretching, the draw ratio at break in the secondary stretching was 3.0.

COMPARATIVE EXAMPLE 1

A polyamide (nylon 6) was prepared in the same manner as in Example 1, except that 2200 g of ε-caprolactam and 116 g of distilled water were charged in a pressure vessel. The relative viscosity (ηr) of the polyamide was 3.57.

The polyamide was extruded into film, and the film was evaluated in the same manner as in Example 1. The degree of whole molecule planar orientation is shown in Table 1. In the successive biaxial stretching, the draw ratio at break in the secondary stretching was 1.3.

COMPARATIVE EXAMPLE 2

A polyamide (nylon 6/nylon 6 copolyamide) was prepared in the same manner as in Example 1, except that 2200 g of ε-caprolactam, 30.1 g of hexamethylenediamine, 38.9 g of adipic acid, and 119 g of distilled water were charged in a pressure vessel. The relative viscosity (ηr) of the polyamide was 3.50.

The polyamide was extruded into film, and the film was evaluated in the same manner as in Example 1. The degree of whole molecule planar orientation is shown in Table 1. In the successive biaxial stretching, the draw ratio at break in the secondary stretching was 2.5.

TABLE 1

| | Degree of Whole Molecule Planar Orientation (×10³) | | |
| --- | --- | --- | --- |
| | Stretching Temp.: 50° C. | Stretching Temp.: 60° C. | Stretching Temp.: 70° C. |
| Example 1 | 11.0 | 12.5 | 15.1 |
| Example 2 | 12.9 | 14.5 | 16.5 |
| Example 3 | 13.0 | 14.5 | 17.1 |
| Example 4 | 12.2 | 13.8 | 18.8 |

TABLE 1-continued

| | Degree of Whole Molecule Planar Orientation (×10³) | | |
| --- | --- | --- | --- |
| | Stretching Temp.: 50° C. | Stretching Temp.: 60° C. | Stretching Temp.: 70° C. |
| Example 5 | 13.1 | 14.7 | 18.7 |
| Compara. Example 1 | 15.6 | 17.3 | 23.6 |
| Compara. Example 2 | 15.8 | 17.1 | 21.7 |

EXAMPLE 6

The same polyamide as obtained in Example 1 was extruded by use of a melt extruder (CS-4026N, manufactured by Uniplus) at a cylinder temperature of 280° C. to obtain a monofilament having a diameter of 2 mm. The monofilament was set on a handy-type stretching machine, preheated in a heating oven at 60° C. for 5 minutes, and stretched at that temperature at a stretch rate of 3 mm/sec. The test was repeated five times. In every test the filament was uniformly stretched up to 5.5 times.

COMPARATIVE EXAMPLE 3

The same polyamide as obtained in Comparative Example 1 was extruded by use of a melt extruder CS-4026N at a cylinder temperature of 280° C. to obtain a monofilament having a diameter of 2 mm. The monofilament was stretched on a handy-type stretching machine in the same manner as in Example 6. As a result of repeating the test five times, the filament was broken when it was stretched 3.3 to 4.6 times.

EXAMPLE 7

In the same pressure vessel as used in Example 1 were charged 2000 g of 6-aminocaproic acid, 54.8 g of a mixture of 2,2,4-trimethyl-1,6-diaminohexane and 2,4,4-trimethyl-1,6-diaminohexane (Vestamine TMD), 50.5 g of adipic acid, and 200 g of distilled water. The inner atmosphere was displaced with nitrogen by repeating nitrogen introduction followed by nitrogen release several times, and the inner temperature was raised to 270° C. The mixture was allowed to react at 270° C. for 6 hours with stirring while introducing nitrogen gas at a rate of 150 ml/min. The stirring was ceased, and a molten polyamide thus produced was withdrawn in the form of a strand, washed with water, and pelletized to obtain 1600 g of pellets. The resulting pellets were washed with running hot water at 90 to 95° C. for several hours and dried in vacuo at 80° C. for 24 hours. The resulting polyamide had a relative viscosity (ηr) of 3.63.

The polyamide was extruded into film, and the film was successively biaxially stretched in the same manner as in Example 1. The draw ratio at break in the secondary stretching was 3.8.

EXAMPLE 8

In a 5-liter pressure vessel equipped with a stirrer, a thermometer, a pressure gauge, and a pressure control and having an outlet for withdrawing a polymer produced were charged 2200 g of ε-caprolactam, 40.4 g of norbornanediamine (NBDA, available from Mitui Chemical), 37.9 g of adipicacid, and 114 g of distilled water. The inner atmosphere was displaced with nitrogen by repeating nitrogen introduction followed by nitrogen release several times, and the inner temperature was raised to 240° C. The mixture was allowed to react at 240° C. for 4 hours with stirring. After the temperature was elevated up to 270° C., the pressure was released to reduce the gauge pressure to 0 MPa over a 2-hour period. Subsequently, the reaction mixture was stirred at 270° C. for 2.25 hours while introducing nitrogen gas at a rate of 150 ml/min. The stirring was ceased, and a molten polyamide thus produced was withdrawn in the form of a strand, washed with water, and pelletized to obtain about 1800 g of pellets. The resulting pellets were washed with running hot water at 95° C. for 12 hours and dried in vacuo at 80° C. for 24 hours. The resulting polyamide had a relative viscosity ($\eta r$) of 3.24.

The polyamide (1500 g) was mixed with 0.45 g of calcium stearate, and the mixture was fed to an extruder equipped with a coathanger flat die (Labo-Plastomill 2D25S, manufactured by Toyo Seiki Seisakusho), melt kneaded at 260° C., and extruded onto chill rolls kept at about 45° C. to obtain an unstretched film having a thickness of 120 $\mu$m. The unstretched film was stored in an aluminum bag at 0° C. or below so as not to absorb moisture until evaluation of stretching properties.

A 92 mm long and 92 mm wide sample piece cut out of the unstretched film was set on a biaxial stretching machine BIX-703, preheated in a prescribed temperature atmosphere (50° C., 60° C. or 70° C.) for about 20 seconds, and stretched three times in the extruding direction in the same temperature atmosphere at a rate of 35 mm/sec, followed by heat setting at 180° C. The degree of whole molecule planar orientation of the resulting uniaxially stretched film was measured. The results obtained are shown in Table 2.

Further, a 92 mn long and 92 mm wide sample piece cut out of the unstretched film was uniaxially stretched in the same manner as described above in a 60° C. atmosphere and then stretched in the direction perpendicular to the primary stretching direction under the same conditions as in the primary stretching until the film was broken. The draw ratio at break in the secondary stretching was 4.3.

EXAMPLE 9

The unstretched polyamide film prepared in Example 8 was evaluated in the same manner as in Example 8, except that the stretch rate was changed to 140 mm/sec. The degree of whole molecule planar orientation of the uniaxially stretched film is shown in Table 2. The draw ratio at break in the secondary stretching was 4.1.

EXAMPLE 10

A polyamide was prepared in the same manner as in Example 8, except that 2200 g of $\epsilon$-caprolactam, 26 g of NBDA, 24.6 g of adipic acid, and 113 g of distilled water were charged in a pressure vessel. The relative viscosity ($\eta r$) of the polyamide was 3.31.

The polyamide was extruded into film, and the film was evaluated in the same manner as in Example 8. The degree of whole molecule planar orientation of the uniaxially stretched film is shown in Table 2. The draw ratio at break in the secondary stretching was 3.5.

EXAMPLE 11

The unstretched polyamide film prepared in Example 10 was evaluated in the same manner as in Example 8, except that the stretch rate was changed to 140 mm/sec. The degree of whole molecule planar orientation of the uniaxially stretched film is shown in Table 2. The draw ratio at break in the secondary stretching was 3.3.

COMPARATIVE EXAMPLE 4

A polyamide (nylon 6) was prepared in the same manner as in Example 8, except that 2200 g of $\epsilon$-caprolactam and 110 g of distilled water were charged in a pressure vessel. The relative viscosity ($\eta r$) of the polyamide was 4.05.

The polyamide was extruded into film, and the film was evaluated in the same manner as in Example 8. The degree of whole molecule planar orientation is shown in Table 2. The draw ratio at break in the secondary stretching was 1.4.

COMPARATIVE EXAMPLE 5

A polyamide (nylon 6/nylon 66 copolyamide) was prepared in the same manner as in Example 8, except that 2200 g of $\epsilon$-caprolactam, 30.1 g of hexamethylenediamine, 38.9 g of adipic acid, and 119 g of distilled water were charged in a pressure vessel. The relative viscosity ($\eta r$) of the polyamide was 3.50.

The polyamide was extruded into film, and the film was evaluated in the same manner as in Example 8. The degree of whole molecule planar orientation is shown in Table 2. The draw ratio at break in the secondary stretching was 1.8.

TABLE 2

| | Degree of Whole Molecule Planar Orientation ($\times 10^3$) | | |
|---|---|---|---|
| | Stretching Temp.: 50° C. | Stretching Temp.: 60° C. | Stretching Temp.: 70° C. |
| Example 8 | 11.3 | 12.4 | 14.7 |
| Example 9 | 11.0 | 12.1 | 14.0 |
| Example 10 | 12.7 | 14.1 | 16.2 |
| Example 11 | 12.1 | 13.4 | 15.8 |
| Compara. Example 4 | 15.5 | 17.0 | 23.4 |
| Compara. Example 5 | 15.1 | 17.5 | 21.8 |

EXAMPLE 12

The same polyamide as obtained in Example 8 was extruded by use of a melt extruder CS-4026N at a cylinder temperature of 280° C. to obtain a monofilament having a diameter of 2 mm. The monofilament was set on a handy-type stretching machine, preheated in a heating oven at 60° C. for 5 minutes, and stretched at that temperature at a stretch rate of 1 mm/sec. The test was repeated five times. In every test the filament was uniformly stretched up to 5.5 times.

COMPARATIVE EXAMPLE 6

The same polyamide as obtained in Comparative Example 4 was extruded into a monofilament, and the monofilament was stretched in the same manner as in Example 12. As a result of repeating the test five times, the filament was broken when it was stretched 3.3 to 4.6 times.

EXAMPLE 13

In a 5-liter pressure vessel equipped with a stirrer, a thermometer, a pressure gauge, and a pressure control and having an outlet for withdrawing a polymer produced were charged 2000 g of 6-aminocaproic acid, 25.8 g of NBDA, 24.4 g of adipic acid, and 100 g of distilled water. The inner atmosphere was displaced with nitrogen by repeating nitrogen introduction followed by nitrogen release several times, and the inner temperature was raised to 270° C. The mixture was allowed to react at 270° C. for 6 hours with stirring while introducing nitrogen gas at a rate of 150 ml/min. The stirring was ceased, and a molten polyamide thus produced was withdrawn in the form of a strand, washed with water, and pelletized to obtain 1600 g of pellets. The resulting pellets were washed with running hot water at 95° C. for 12 hours and dried in vacuo at 80° C. for 24 hours. The resulting polyamide had a relative viscosity ($\eta r$) of 3.53.

The polyamide was extruded into film, and the film was biaxially stretched successively in the same manner as in Example 8. The draw ratio at break in the secondary stretching was 3.8.

EXAMPLE 14

In a 5-liter pressure vessel equipped with a stirrer, a thermometer, a pressure gauge, and a pressure control and having an outlet for withdrawing a polymer produced were charged 2200 g of ε-caprolactam, 43.8 g of isophoronediamine (VESTAMINE IPD, available from Hulls, Japan), 37.9 g of adipic acid, and 114 g of distilled water. The inner atmosphere was displaced with nitrogen by repeating nitrogen introduction followed by nitrogen release several times, and the inner temperature was raised to 250° C. The mixture was allowed to react at 250° C. for 4 hours with stirring. After the temperature was elevated up to 270° C., the pressure was released to reduce the gauge pressure to 0 MPa over a 1-hour period. Subsequently, the reaction mixture was stirred at 270° C. for 4 hours while introducing nitrogen gas at a rate of 150 ml/min. The stirring was ceased, and a molten polyamide thus produced was withdrawn in the form of a strand, washed with water, and pelletized to obtain about 1800 g of pellets. The resulting pellets were washed with running hot water at 95° C. for 12 hours and dried in vacuo at 80° C. for 24 hours. The resulting polyamide had a relative viscosity ($\eta r$) of 3.5.

The polyamide was extruded into film, and the film was evaluated in the same manner as in Example 8. The degree of whole molecule planar orientation is shown in Table 3. The draw ratio at break in the secondary stretching was 3.9.

EXAMPLE 15

The unstretched polyamide film prepared in Example 14 was evaluated in the same manner as in Example 8, except that the stretch rate was changed to 140 mm/sec. The degree of whole molecule planar orientation of the uniaxially stretched film is shown in Table 3. The draw ratio at break in the secondary stretching was 4.2.

EXAMPLE 16

A polyamide was prepared in the same manner as in Example 14, except that 2200 g of ε-caprolactam, 22.0 g of isophoronediamine, 18.88 g of adipic acid, and 112 g of distilled water were charged in a pressure vessel. The relative viscosity ($\eta r$) of the polyamide was 3.61.

The polyamide was extruded into film, and the film was evaluated in the same manner as in Example 8. The degree of whole molecule planar orientation was measured. The result is shown in Table 3. The draw ratio at break in the secondary stretching was 3.4.

EXAMPLE 17

The unstretched polyamide film prepared in Example 16 was evaluated in the same manner as in Example 8, except that the stretch rate was changed to 140 mm/sec. The degree of whole molecule planar orientation of the uniaxially stretched film is shown in Table 3. The draw ratio at break in the secondary stretching was 3.7.

EXAMPLE 18

A polyamide was prepared in the same manner as in Example 14, except for replacing isophoronediamine with 40.2 g of 5-amino-2,2,4-trimethyl-1-cyclopentanemethylamine. The relative viscosity ($\eta r$) of the polyamide was 3.56.

The polyamide was extruded into film, and the film was evaluated in the same manner as in Example 8. The degree of whole molecule planar orientation of the uniaxially stretched film is shown in Table 3. The draw ratio at break in the secondary stretching was 3.8.

EXAMPLE 19

The unstretched polyamide film prepared in Example 18 was evaluated in the same manner as in Example 8, except that the stretch rate was changed to 140 mm/sec. The degree of whole molecule planar orientation of the uniaxially stretched film is shown in Table 3. The draw ratio at break in the secondary stretching was 3.9.

COMPARATIVE EXAMPLE 7

A polyamide (nylon 6) was prepared in the same manner as in Example 14, except that 2200 g of ε-caprolactam and 110 g of distilled water were charged in a pressure vessel. The relative viscosity ($\eta r$) of the polyamide was 4.05.

The polyamide was extruded into film, and the film was evaluated in the same manner as in Example 8. The degree of whole molecule planar orientation of the uniaxially stretched film is shown in Table 3. The draw ratio at break in the secondary stretching was 1.4.

COMPARATIVE EXAMPLE 8

A polyamide (nylon 6/nylon 66 copolyamide) was prepared in the same manner as in Example 14, except that 2200 g of ε-caprolactam, 30.1 gofhexamethylenediamine, 38.9 g of adipic acid, and 119 g of distilled water were charged in a reaction vessel. The relative viscosity ($\eta r$) of the polyamide was 3.5.

The polyamide was extruded into film, and the film was evaluated in the same manner as in Example 8. The degree of whole molecule planar orientation of the uniaxially stretched film is shown in Table 3. The draw ratio at break in the secondary stretching was 1.8.

TABLE 3

| | Degree of Whole Molecule Planar Orientation ($\times 10^3$) | | |
| --- | --- | --- | --- |
| | Stretching Temp.: 50° C. | Stretching Temp.: 60° C. | Stretching Temp.: 70° C. |
| Example 14 | 11.5 | 12.8 | 15.0 |
| Example 15 | 11.1 | 12.1 | 14.5 |
| Example 16 | 12.8 | 14.3 | 16.8 |
| Example 17 | 12.3 | 13.7 | 15.8 |
| Example 18 | 11.7 | 12.3 | 14.9 |
| Example 19 | 11.2 | 12.0 | 14.7 |
| Compara. Example 7 | 15.5 | 17.0 | 23.4 |
| Compara. Example 8 | 15.1 | 17.5 | 21.8 |

EXAMPLE 20

The same polyamide as obtained in Example 14 was extruded by use of a melt extruder CS-4026N at a cylinder temperature of 280° C. to obtain a monofilament having a diameter of 2 mm. The monofilament was set on a handy-type stretching machine, preheated in a heating oven at 60° C. for 5 minutes, and stretched at that temperature at a stretch rate of 1 mm/sec. The test was repeated five times. In every test the filament was uniformly stretched up to 5.5 times.

COMPARATIVE EXAMPLE 9

The same polyamide as obtained in Comparative Example 7 was extruded to obtain a monofilament, and the resulting monofilament was stretched in the same manner as in Example 20. As a result of repeating the test five times, the filament was broken when it was stretched 3.3 to 4.6 times.

EXAMPLE 21

In a 5-liter pressure vessel equipped with a stirrer, a thermometer, a pressure gauge, and a pressure control and having an outlet for withdrawing a polymer produced were charged 2000 g of 6-aminocaproic acid, 34.72 g of isophoronediamine, 29.8 g of adipic acid, and 100 g of distilled water. The inner atmosphere was displaced with nitrogen by repeating nitrogen introduction followed by nitrogen release several times, and the inner temperature was raised to 270° C. The mixture was allowed to react at that temperature for 6 hours with stirring while introducing nitrogen gas at at rate of 150 ml/min. The stirring was ceased, and a molten polyamide thus produced was withdrawn in the form of a strand, washed with water, and pelletized to obtain 1600 g of pellets. The resulting pellets were washed with running hot water at 95° C. for 12 hours and dried in vacuo at 80° C. for 24 hours. The resulting polyamide had a relative viscosity ($\eta r$) of 3.48.

The polyamide was extruded into film, and the film was biaxially stretched successively in the same manner as in Example 8. The draw ratio at break in the secondary stretching was 3.7.

The polyamide according to the present invention is a polyamide synthesized from a lactam and/or an aminocarboxylic acid, a dicarboxylic acid, and a diamine component containing at least one of the specific diamine compounds preferably in a proportion of 10 to 100 mol % based on the total diamine component. The polyamide of the invention is excellent in stretching properties and is suitable as amaterial of successive biaxial stretching film.

While the invention has been described in detail and with reference to specific embodiments thereof, it will be apparent to one skilled in the art that various changes and modifications can be made therein without departing from the spirit and scope thereof.

This application is based on Japanese patent applications No. 11-147572 filed on May 27, 1999, No. 11-174944 filed on Jun. 22, 1999, and No. 11-210174 filed on Jul. 26, 1999.

What is claimed is:

1. A polyamide with excellent stretching properties which comprises a unit derived from a lactam and/or an aminocarboxylic acid, a unit derived from a dicarboxylic acid, and a unit derived from a diamine component containing at least one compound selected from the group consisting of a branched saturated diamine having 6 to 22 carbon atoms, a branched alicyclic diamine having 6 to 16 carbon atoms, and a norbornanediamine.

2. The polyamide according to claim 1, wherein said diamine component comprises at least one compound selected from the group consisting of a branched saturated diamine having 6 to 22 carbon atoms, a branched alicyclic diamine having 6 to 16 carbon atoms, and a norbornanediamine in a proportion of 10 to 100 mol % based on the total diamine component.

3. The polyamide according to claim 1, which comprises 50 to 99.8 mol % of the unit derived from a lactam and/or an aminocarboxylic acid, 0.1 to 25 mol % of the unit derived from a dicarboxylic acid, and 0.1 to 25 mol % of the unit derived from a diamine component, wherein 10 to 100 mol % of said diamine component is at least one compound selected from the group consisting of a branched saturated diamine having 6 to 22 carbon atoms, a branched alicyclic diamine having 6 to 16 carbon atoms, and a norbornanediamine.

4. The polyamide according to claim 1, wherein said branched saturated diamine is 2,2,4-trimethyl-1,6-diaminohexane, 2,4,4-trimethyl-1,6-diaminohexane, 1,2-diaminopropane, 1,3-diaminopentane, 2-methyl-1,5-diaminopentane, 2-methyl-1, 8-diaminooctane, or a mixture thereof.

5. The polyamide according to claim 2, wherein said branched saturated diamine is 2,2,4-trimethyl-1,6-diaminohexane, 2,4,4-trimethyl-1,6-diaminohexane, 1,2-diaminopropane, 1,3-diaminopentane, 2-methyl-1,5-diaminopentane, 2-methyl-1,8-diaminooctane, or a mixture thereof.

6. The polyamide according to claim 3, wherein said branched saturated diamine is 2,2, 4-trimethyl-1, 6-diaminohexane, 2,4,4-trimethyl-1,6-diaminohexane, 1,2-diaminopropane, 1,3-diaminopentane, 2-methyl-,1,5-diaminopentane, 2-methyl-1,8-diaminooctane, or a mixture thereof.

7. The polyamide according to claim 1, wherein said branched alicyclic diamine is 5-amino-2,2,4-trimethyl-1-cyclopentanemethylamine, 5-amino-1,3,3-trimethylcyclohexanemethylamine, or a mixture thereof.

8. The polyamide according to claim 2, wherein said branched alicyclic diamine is 5-amino-2,2,4-trimethyl-1-cyclopentanemethylamine, 5-amino-1,3,3-trimethylcyclohexanemethylamine, or a mixture thereof.

9. The polyamide according to claim 3, wherein said branched alicyclic diamine is 5-amino-2,2,4-trimethyl-1-cyclopentanemethylamine, 5-amino-1,3,3-trimethylcyclohexanemethylamine, or a mixture thereof.

10. A film, a monofilament, or a fiber prepared from the polyamide claimed in claim 1.

11. A successive biaxial stretching film prepared from the polyamide claimed in claim 1.

* * * * *